United States Patent [19]

Lipton

[11] Patent Number: 4,472,037
[45] Date of Patent: Sep. 18, 1984

[54] ADDITIVE COLOR MEANS FOR THE CALIBRATION OF STEREOSCOPIC PROJECTION

[75] Inventor: Lenny Lipton, Point Richmond, Calif.

[73] Assignee: Stereographics Corporation, San Rafael, Calif.

[21] Appl. No.: 295,401

[22] Filed: Aug. 24, 1981

[51] Int. Cl.³ .............................................. G03B 35/00
[52] U.S. Cl. ....................................... 352/57; 352/41; 352/42
[58] Field of Search ...................... 352/39, 40, 41, 42, 352/45, 57, 67

[56] References Cited

U.S. PATENT DOCUMENTS

| | | | |
|---|---|---|---|
| 1,192,876 | 8/1916 | Ebeling | 362/232 |
| 1,232,504 | 7/1917 | Comstock | 352/40 |
| 1,880,026 | 9/1932 | Singerman | 350/317 |
| 1,953,958 | 4/1934 | Gilmore | 352/67 |
| 1,985,471 | 12/1934 | Thomas | 352/67 |
| 3,402,637 | 9/1968 | Durst | 352/235 |

*Primary Examiner*—Monroe H. Hayes
*Attorney, Agent, or Firm*—Limbach, Limbach & Sutton

[57] ABSTRACT

Right and left projected image fields of stereoscopic images must have even illumination. If audiences are subjected to uneven illumination intensity of right and left pairs of stereoscopic images, the result for most people will be discomfort. Complimentary colored filters are used in the optical paths of the right and left projected fields, and the resultant additive color mixture is used for evaluation of symmetrical illumination. A means is thus presented for quickly, accurately, and inexpensively calibrating right and left image fields for both equal and even illumination intensity.

4 Claims, 5 Drawing Figures

ADDITIVE COLOR MEANS FOR THE CALIBRATION OF STEREOSCOPIC PROJECTION

BACKGROUND OF THE INVENTION

I have presented the concept of the binocular symmetrical properties of stereoscopic image fields (paper given orally, SMPTE Technical Conference, Los Angeles, Oct. 20, 1977) and have elaborated on the idea in my book, FOUNDATIONS OF THE STEREOSCOPIC CINEMA (to be published by Van Nostrand Reinhold, 1982). Other workers, such as Norling (PSA Journal, Vol. 18, Jan. 1952) have understood the idea in the context of the present teaching, namely, of illumination symmetry.

The two projected stereoscopic image fields must be very much alike to specifiable tolerances in terms of abberation, illumination, geometry, color, registration, and temporal symmetry. The only desired difference is horizontal parallax, which is controlled at the time of photography and is directly responsible for the depth cue of stereopsis. I have found in the course of my research that departures from the symmetrical conditions enumerated above lead to viewer discomfort, and that this discomfort is generally referred to parts of the body other than the eyes. The various asymmetries are psychologically additive. Moreover, the effect of these disturbances are cumulative with time.

In the present disclosure I am concerned with projection and the control of illumination symmetry in order to minimize viewer discomfort. The method I employ is rapid, economical, and within the means of the average theatrical projectionist to employ successfully. Heretofore, such means have not been available.

The invention uses additive color for a visual comparison of the illumination intensity of left and right fields. I have searched the literature and can find no similar application of this technique. Gruber, in U.S. Pat. No. 2,700,322 describes an additive color technique for the alignment of lens axes in stereoscopic projection, so that additive color fringes might be observed if projected targets are not precisely in superimposition.

Culver, Maule, and Unterborg (IBM Technical Disclosure Bulletin, Vol. 17, No. 10, March 1975) describe a similar technique for alignment of parts.

However, the present disclosure is substantially different and is concerned with the calibration of illumination intensity.

SUMMARY OF THE INVENTION

Complimentary colored filters are introduced into the optical paths of the right and left portions of a stereoscopic projector or projectors. The resultant additive color mixture is evaluated at the surface of the screen. If the overall additive color mixture is some specifiable color, and the additive color is uniform over the surface of the screen, then satisfactory projection can be achieved. If there are areas of the screen with color different from the established standard, then either one or both projectors may be adjusted to achieve the condition of illumination symmetry.

DESCRIPTION OF THE ILLUSTRATED PREFERRED EMBODIMENTS

Figures 1A, 1B:
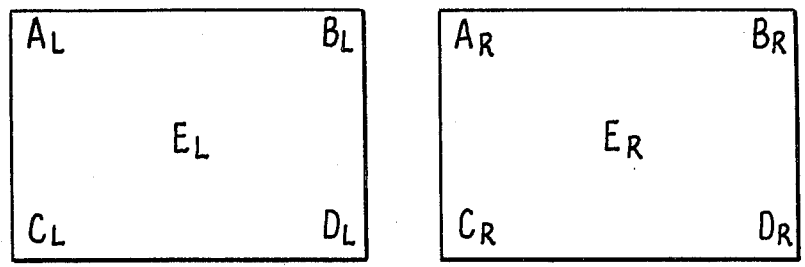
FIG. 1A shows selected sample points for measurement of illumination intensity at the surface of a screen for the left field of a projected pair of stereoscopic images.
FIG. 1B shows selected sample points for measurement of illumination intensity at the surface of a screen for the right field of a projected pair of stereoscopic images.

We can imagine two fields of illumination superimposed on the surface of a screen during stereoscopic projection. Let us operate the projectors without any film so that "white" light is cast upon the screen. The two fields are represented by FIG. 1A for the left field, and FIG. 1B for the right field. The letters A, B, C, D, E, with appropriate subscripts L and R, denote exactly the same points on the screen, for the left and right fields respectively. Point E is screen dead center. Points A, B, C, D are corner points some set distance inward from the very edge of the screen surround. For the purposes of discussion we could assume that these points are taken to be 10% of the length of the diagonal measured inward toward the center of the screen along the diagonal.

Figure 2:
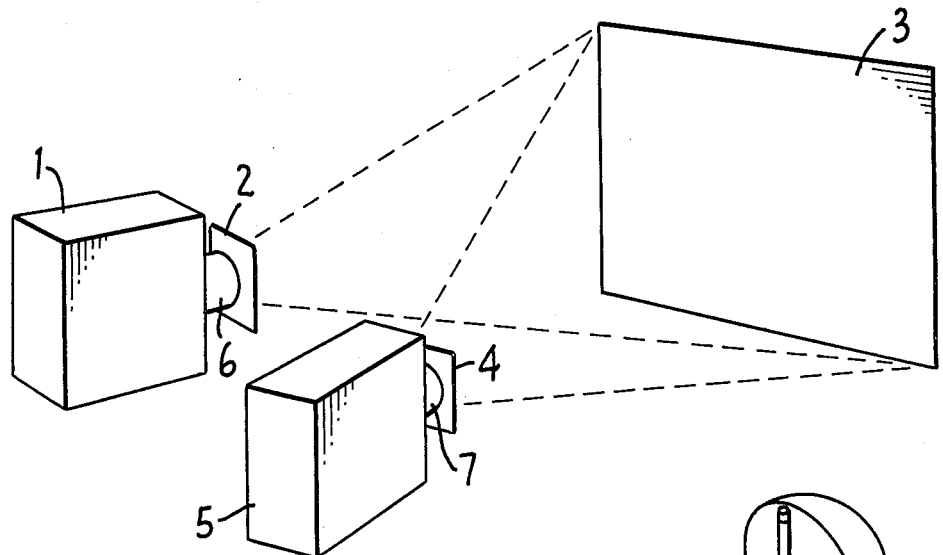
FIG. 2 is a schematic drawing showing the invention applied to double system projection.
Figure 3:
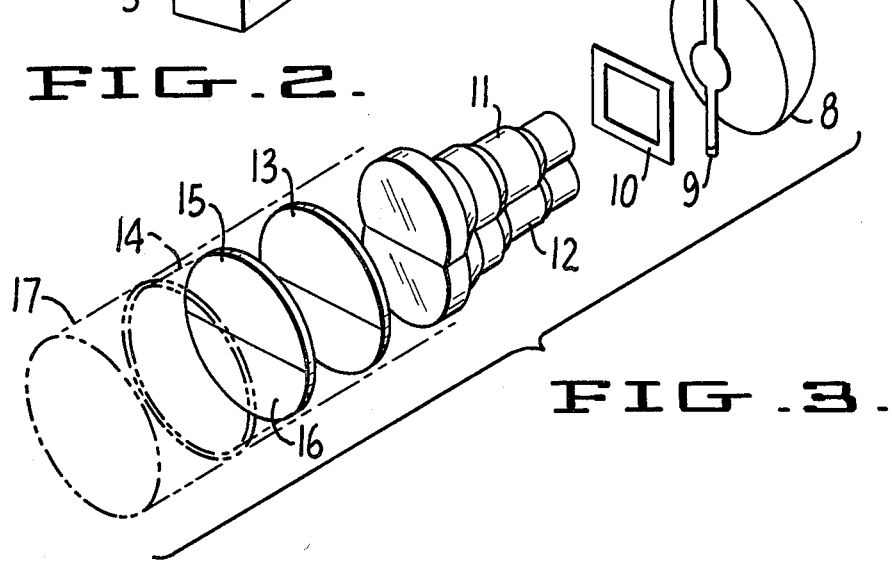
FIG. 3 is a schematic view of the invention applied to a single system projection.

If we were to operate first the left and then the right projector, in the case of double band projection, as shown in FIG. 2, or occlude first one half of a dual lens ensemble and then the other, as shown in FIG. 3, we could study the intensity of light reflected at the surface of the screen toward an observer, or we could just as well study the light incident upon the surface of the screen.

Photoelectric measuring devices for studying light intensity are well known in the art and need not be discussed here. If the five points specified above were measured for the left and right fields, and if these sample points were then tabulated and compared, we could then readily compare and evaluate the evenness of intensity of illumination incident upon or reflected from the surface of the screen. If the comparison of left and right illumination intensity sample points showed that one corner of the left field was darker than one corner of the right field, steps could be taken to correct the situation.

For example, if point $A_L$ was some 20% darker than point $A_R$ we could then adjust the optical system of one or both of the projectors to bring the level of illumination of both points to within some reasonable specifiable tolerance.

In the course of nearly six years and in many screenings for hundreds of test subjects I have determined that if only one corner of the left and right image fields are mismatched in terms of intensity, for example as described above for points $A_L$ and $A_R$, then eyestrain, or discomfort will result in the great majority of observers. This is a major cause of the lack of acceptance of the stereoscopic medium, and heretofore means for matching right and left fields have not been at hand except in the form of measurements and comparison of image points as described above, with the use of photoelectric sensors or meters.

The technique I describe here does away with the need to use such meters, and to evaluate each image field separately, and places in the hands of the theatrical projectionist a means for calibration of the two image fields whilst both are on the screen, and obviates the need for a point by point analysis of screen illumination intensity, which lies more in the province of the skilled engineer than the motion picture projectionist.

If as shown in FIG. 2 projectors 1 and 5 using lenses 6 and 7 respectively, and projecting onto screen 3, have mounted in front of each lens complimentary colored filters 2 and 4, of approximately equal density, then direct evaluation of the relative contributions of illumination of projectors 1 and 5, may be visually evaluated in terms of color. Let us suppose that we are operating the projectors in question without any film, and that we are using a red filter 2 at the left projector 1 and a green filter 4 at the right projector 5. The filters that I have employed in my work have been Lee primary red and Lee primary green. These filters are sturdy, inexpensive, and have adequate optical quality for the application at hand.

It should also be obvious to those skilled in these arts that the technique described here will work just as well in conjunction with still or motion picture projection, and for video projection.

When filters 2 and 4 are in place and no film is threaded in 1 and 5, there will occur an additive color mixture at the surface of the screen, and this mixture, for the Lee filters specified above, will be a warm or deep yellow color when the intensity of projectors 1 and 5 are matched so that each produces an equal contribution of illumination. It should be obvious to the reader that other filter combinations may also be used. Various other filters of similar color by other manufacturers will suffice, or even other colors that may be favored by the user.

If the overall illumination of both projectors is equal, and they contribute 50% each to the total light reaching the screen, then an overall warm yellow color will be seen at all points on the screen. Thus the operator of the projectors can evaluate, virtually at a glance, illumination symmetry. He may be provided with a sample color card, or a transparency which may be rear illuminated by a standard light source, so that he may have some standard at hand with which to compare screen color and intensity. The reader will understand that the technique employed here translates intensity into color so that rapid and simple determinations of intensity may be made in terms of color evaluation.

Let us suppose that corner A shows a reddish color, while the rest of the screen exhibits the desired warm yellow color. This tells the operator that the projector with the red filter, in this case, left projector 1 with red filter 2, is brighter than its corresponding projector 5 with right green filter 4. Now steps can be taken to adjust the optical systems of the projectors to bring about the desired condition of illumination symmetry.

It should be stated that before this test is conducted a focusing test film ought to be run through both projectors in order to make sure that both projected beams are of equal size. Once the projectors are focused the film can be withdrawn from the projector. Or alternatively, special films can be prepared so that one is, for example, red, and the other green. In such a way the filters used in front of the lens may be eliminated if this should prove to be a convenient approach.

In order to obtain equal illumination of all screen points, especially of A which we have been discussing, various steps can be taken to adjust the projector's optical systems, depending upon the specific nature of the system. If low voltage lamps with built in reflections are used, they might be reaimed properly, or a new lamp might be substituted for an old one. If xenon arcs are used, set screws may be employed to adjust the position of the lamps' reflectors.

In some cases the lens itself may be found to be improperly positioned in its mount, or other defects may be pin pointed and corrected. Usually the lamp or reflector needs adjustment.

In the case of the projection lens shown in FIG. 3, which is made up of two lenses mounted in a single barrel after the manner favored by Condon, U.S. Pat. No. 4,235,503 similar techniques may be employed. Bernier U.S. Pat. No. 3,531,191 has also shown prisms sets that combine left and right images of the over-and-under format. In this example, as shown in FIG. 3, we are concerned with the technique of combining left and right image fields for single rather than double band projection, in which case both images are placed adjacent to each other on the same piece of film. In the case of the illustrated embodiment shown in FIG. 3, for lens 17, made up of dual optics 11 and 12, projecting through sheet polarizers 13, we place the complimentary color filters in a tube or cylinder which may be slid into place in the lens barrel 17. Thus the calibration device may be inserted and withdrawn from the optical system rapidly and it may be adjusted so that the line bisecting red 15 and green 16 may be adjusted to be horizontal or aligned with the dividing line between 11 and 12.

Note that the preferred embodiment, tube 14 inserted into lens 17, is made up of red and green filters semi-circular in shape and bisected by a diameter and that said diameter must be made to correspond with the line bisecting 11 and 12. The filters mounted in 14 may be made of glass or acetate or other materials cemented to glass so long as they do not fade rapidly and give good service and so that they are resistant to the hot environment found within a lens employed for arc projection. Note also that the filters 15 and 16 must be placed as close as possible to the lenses 11 and 12 because the left and right images begin to cross over very rapidly only a short distance from 11 and 12 and it is important to segregate the effect of each filter to its specific image field.

Once the tube 14 is in place and correctly aligned, the procedure described above in FIG. 2, for dual projection, is followed in essence. The projector is operated without any film in place and light passes through aperture plate 10, originating in this case in xenon arc source 9 using reflector 8. It has been my experience that projectors used for planar projector will rarely be in good alignment for stereoscopic projection and that the function of calibration device 14 is absolutely invaluable for rapid and accurate setting up of 3-D projection.

Most often the placement of the reflector 8 needs adjustment. While observing the screen the operator can adjust the lamp set screws, which are usually on the rear or side surface of the lamp housing. Once an overall and uniform deep yellow, for Lee primary red and green, has been achieved, stereoscopic projection may proceed.

It would also be possible to employ glass filters introduced into the aperture plates itself.

Where arc illumination is employed for projection, the sheet polarizers used within the projection lenses may be subjected to heat radiation sufficient to cause them to be damaged, when projection is carried out without film. The motion picture film itself acts as a heat absorbing filter, and prevents damage to the sheet polarizers, since the base and emulsion of the film hold back a portion of the heat radiation. Thus it may be damaging to the polarizers to operate the projector without film, with the additive color filters placed after the sheet polarizers as recommended above.

Figure 4:
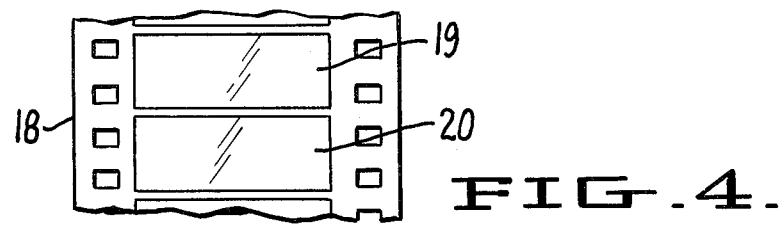
FIG. 4 shows the layout of the over-and-under format using right and left frames printed with complimentary colors.

The preferred embodiment of the invention in this event, illustrated in FIG. 4 for the over-and-under 35 mm format 18, is to use left 20, right 19, images each colored in accordance with the recommendations in this disclosure. In other words, each half of the stereopair would then have complementary colors, so that additive color mixing could take place at the screen. Thus, the projector operator can observe the comparative intensity of illumination of the left and right fields in terms of additive color mixing.

The colors for the left 20 and right 19 frames may be generated by any one of a number of well known techniques: colored filters such as the Eastman Wratten series numbers 25, 26 or 29 red, or numbers 58, 60, 61 green, may be used over the lenses while photographing white cards, or colored cards might be photographed, or filter sheets might be rear illuminated on light boxes and photographed.

Such a print might be made up in the form of a loop, or a length of film spliced end-to-end, which is threaded onto the projector so that the calibration procedure may be carried out for an extended time.

Earlier in this disclosure I mentioned that the projectionist might be supplied with a standard colored reference card for use in judging whether the overall intensity of both left and right fields was properly balanced. Now, in the context of single band projection, I suggest simply interchanging left and right fields so that the red field now becomes a green field, and vice versa. If the overall color of the projected image remains the same, after interchanging the colors of the fields, then the operator knows that the overall intensity of left and right projected fields is equal.

For single band projection this is simply achieved by operating the frame line control to place the left frame in what had previously been the right position and vice versa.

Thus, without the aid of photo-electric instruments, without the need to occlude lenses 11 and 12 in turn, without the need to tabulate data, successful calibration of a projector heretofore employed for 2-D may now be employed for 3-D. Such a calibration may take place in minutes, using a low cost complimentary color filter ensemble, and such calibration may take place at the projector without the operator having to take measurements at the surface of the screen.

What is claimed is:

1. In a stereoscopic projection system which includes the projection of left and right images on a screen, a method of providing uniform illumination of both images across the entire field of the screen comprising the steps of:
    projecting a complementary first color on the screen to define the left image;
    projecting a second, different complementary color on the screen to define the right image in a manner such that the combination of the left and right images generate a third color; and
    adjusting the illumination intensity of portions of the left and right image fields to produce uniformity of the third color over the field thereby achieving uniform illumination intensity of both left and right images across the field.

2. A process as recited in claim 1 wherein each projecting steps are carried out by placing a colored filter in the optical path of a projector.

3. A process as recited in claim 2 wherein one of the filters is red and the other filter is green such that the generated third color is yellow.

4. A process as recited in claim 1 further comprising the steps of:
    providing a transparency tinted to the shade of the desired third color;
    comparing the shade of the transparency to the generated third color.

* * * * *